United States Patent [19]

Maejima et al.

[11] Patent Number: 4,615,005
[45] Date of Patent: Sep. 30, 1986

[54] DATA PROCESSING APPARATUS WITH CLOCK SIGNAL CONTROL BY MICROINSTRUCTION FOR REDUCED POWER CONSUMPTION AND METHOD THEREFOR

[75] Inventors: Hideo Maejima; Koyo Katsura, both of Hitachi; Toshimasa Kihara, Tachikawa; Yasushi Akao, Kodaira, all of Japan

[73] Assignee: Hitachi, Ltd., Tokyo, Japan

[21] Appl. No.: 632,820

[22] Filed: Jul. 20, 1984

Related U.S. Application Data

[63] Continuation of Ser. No. 315,058, Oct. 26, 1981, abandoned.

[30] Foreign Application Priority Data

Oct. 27, 1980 [JP] Japan .................. 55-150900

[51] Int. Cl.⁴ .................. G06F 11/00; G06F 7/38
[52] U.S. Cl. .................. 364/200; 364/707
[58] Field of Search .................. 364/200, 900, 707; 307/208

[56] References Cited

U.S. PATENT DOCUMENTS

| | | | |
|---|---|---|---|
| 3,919,692 | 11/1975 | Kronies et al. | 364/200 |
| 3,919,695 | 11/1975 | Gooding | 364/200 |
| 3,941,989 | 3/1976 | MacLaughlin et al. | 364/200 |
| 4,084,262 | 4/1978 | Lloyd et al. | 364/900 |
| 4,125,871 | 11/1978 | Martin | 364/900 |
| 4,137,563 | 1/1979 | Tsunoda | 364/200 |
| 4,143,417 | 3/1979 | Wald et al. | 364/900 |
| 4,164,666 | 8/1979 | Hirasawa | 364/900 |
| 4,164,786 | 8/1979 | Gollomp | 364/200 |
| 4,171,539 | 10/1979 | Tawfik et al. | 364/900 |
| 4,203,153 | 5/1980 | Boyd | 364/200 |
| 4,285,043 | 8/1981 | Hashimoto et al. | 364/707 |
| 4,316,247 | 2/1982 | Iwamoto | 364/707 |
| 4,348,743 | 9/1982 | Dozier | 364/900 |

FOREIGN PATENT DOCUMENTS 1052278 2/1978 Japan .

Primary Examiner—Gareth D. Shaw
Assistant Examiner—Daniel K. Dorsey
Attorney, Agent, or Firm—Antonelli, Terry & Wands

[57] ABSTRACT

Disclosed is a method of controlling the supply of a clock signal to a logic circuit, especially, a logic circuit composed of C-MOS gates for further reducing the power consumption. According to the control method, a clock signal supply inhibit instruction is stored, so that, when this instruction is read out, the supply of the clock signal to the logic circuit is inhibited, or its level is fixed at a specific signal level. In response to the application of an interrupt signal, the clock signal having been inhibited to be supplied to the logic circuit starts to be supplied to the logic circuit again. The circuit region or regions for which the supply of the clock signal is to be inhibited can be freely selected for the purpose of control. Thus, the method is especially effective when it is desired to closely control the saving of power consumed by the logic circuit.

32 Claims, 13 Drawing Figures

DATA PROCESSING APPARATUS WITH CLOCK SIGNAL CONTROL BY MICROINSTRUCTION FOR REDUCED POWER CONSUMPTION AND METHOD THEREFOR

This is a continuation of application Ser. No. 315,058, filed Oct. 26, 1981, now abandoned.

BACKGROUND OF THE INVENTION

This invention relates to a data processing apparatus, and more particularly to a method of clock signal supply control suitable for application to a data processing apparatus including an LSI (a large scale integrated circuit) consuming a small amount of power.

The progress of technology in the field of semiconductors in recent years is very remarkable. Especially, the progress of technology in the field of MOS (metal oxide semiconductor) devices is quite remarkable. With the progress of the MOS technology, semiconductor circuit elements of smaller sizes and reduced dimensions are available, and it is now possible to integrate many circuits on a square chip which is as small as several millimeters on a side.

However, such a chip which has a high integration density or operates at a high speed requires increased power consumption per unit area, and the dissipation of heat from the elements is an important problem.

In view of the above problem, the so-called C-MOS (complementary MOS) device is now highlighted since this device consumes power only during the changing time of signal levels. By virtue of such low power consumption of the C-MOS device, power can be supplied to the device from a battery in the event of power failure. Further, because of the low power consumption, power may be exclusively supplied to the C-MOS device from a battery.

The present invention concerns a method of clock signal supply control for the purpose of further reducing the power consumption of such a C-MOS device.

With the decrease in the size of the device, the power consumption per unit area or power consumption per unit volume tends to increase although the absolute value of consumed power may be small. Therefore, reduction of the power consumption is an important problem.

An electronic desk calculator is a familiar example of a device which is designed so that, when it is left in a condition in which the power source is turned on, the power source is automatically turned off upon lapse of a predetermined period of time after it has been left in the on-condition. Thus, the automatic turning-off of the power source upon lapse of the predetermined period of time can prevent wasteful consumption of power supplied from the power source. However, this effort is limited to the saving of power of the power source by turning off the power source during the period of time in which the desk calculator is left in an inoperative condition without any use. In order to further reduce the power consumed by the device, it is preferable to turn off the power source and then to restore the power supply depending on the state of the device. Such demands are now progressively increasing.

As a known example most analogous to the present invention, there is Japanese Patent Application Laid-open No. 104272/79 entitled "COMPLEMENTARY MOS LOGIC CIRCUITS" (laid open on Aug. 16, 1979). This laid-open application relates to a logic circuit, and more particularly to a circuit for operating a logic circuit composed of complementary MOS gates, with further reduced power consumption.

Describing the practical aspect of the subject matter disclosed in the cited application, a clock inhibit signal is generated from the logic circuit composed of the MOS gates during the period of time in which the logic circuit does not make its logical operation, and this clock inhibit signal is used to control passage of an externally supplied clock signal so as to inhibit application of the external clock signal during the non-operating period of the logic circuit.

It is the intention of the feature dislosed in the cited application to inhibit application of the external clock signal during the non-operating period of a specific logic circuit. The cited application discloses only that the clock signal is controlled by a signal or a non-operation signal indicative of the fact that the specific logic circuit has ceased to operate. While the present invention contemplates to positively reduce the power consumption of such a device, that is, to stop supply of a clock signal by an instruction word, such a description is not found anywhere in the cited application.

There is also U.S. Pat. No. 3,919,695 (issued Nov. 11, 1975) entitled "ASYNCHRONOUS CLOCKING APPARATUS". The apparatus disclosed in this U.S. patent comprises independent clock circuits provided in a plurality of functional units respectively and means for varying the clock cycle.

SUMMARY OF THE INVENTION

It is a primary object of the present invention to provide a method of controlling a clock signal supplied to a logic circuit in a data processing apparatus so as to inhibit the supply of the clock signal to the logic circuit or fix the level of the clock signal at a specific level at any time, thereby reducing the power consumption.

Another object of the present invention is to provide a method in which the extent of the circuit region, for which the supply of the clock signal is inhibited, can be changed as desired.

To attain the above objects, according to a feature of the present invention, there is provided a clock supply inhibit instruction so that, when the clock supply inhibit instruction is read out, the supply of the clock signal to the specific logic circuit is inhibited.

According to another feature of the present invention, when a clock supply inhibit instruction is read out, the circuit region for which the supply of the clock signal is to be inhibited can be changed depending on the read-out inhibit instruction.

According to still another feature of the present invention, the supply of the clock signal to the specific logic circuit is restored in response to the application of an interrupt signal.

BRIEF DESCRIPTION OF THE DRAWINGS

The above and other objects, features of the present invention will be apparent from the following detailed description of preferred embodiments thereof taken in conjunction with the accompanying drawings, in which.

DETAILED DESCRIPTION OF THE PREFERRED EMBODIMENTS

As described hereinbefore, a C-MOS device is featured by the fact that it does not consume power in the absence of any change in the level of a signal or signals applied thereto. Therefore, when a clock supply inhibit request signal is used to stop the supply of a clock signal to the C-MOS device, the power consumed by the C-MOS device itself can be correspondingly reduced or saved.

In a logic circuit operating in synchronism with a clock signal, the mean power consumption increases with the increase in the pulse repetition frequency of the clock signal.

When high-speed processing is not required for a unit, such as a data processor unit, the power consumption can also be reduced by decreasing the pulse repetition frequency of the clock signal.

The above cases will now be explained in order.

Figure 1A:
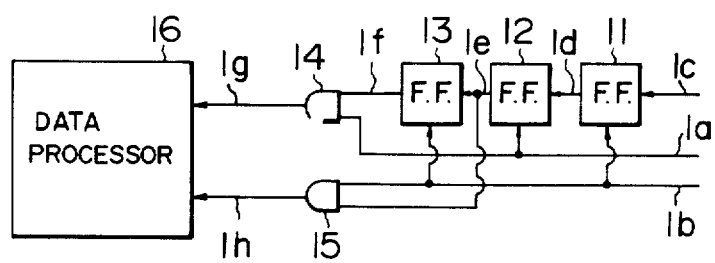
FIG. 1A shows an example of a circuit for stopping the supply of clock signals to a data processing unit in the form of a C-MOS device.
Figure 1B:
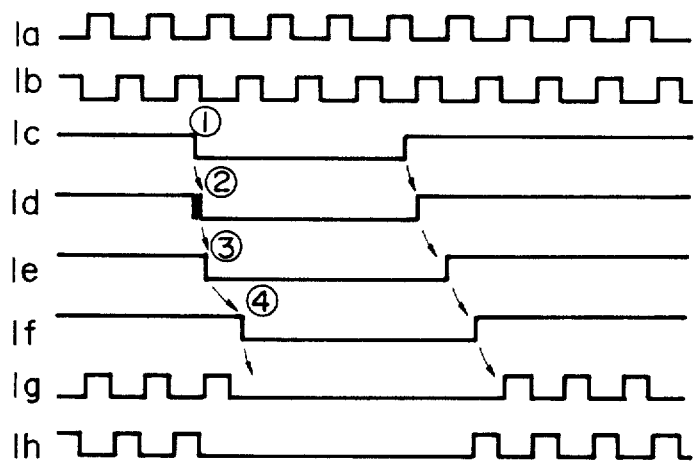
FIG. 1B is a time chart illustrating the operation of the parts shown in FIG. 1A.

A circuit which stops the supply of clock signals to a unit, such as a data processor unit, in response to an externally applied clock signal supply inhibit signal has such a structure as shown in FIG. 1A. The clock supply control circuit shown in FIG. 1A is composed of flip-flops 11, 12 and 13 for synchronizing a clock supply stop request signal 1c with a clock signal 1a of one phase and a clock signal 1b of another phase, and AND gates 14 and 15 inhibiting the supply of the clock signals 1a and 1b to a data processor unit 16. The operation of the circuit shown in FIG. 1A will be described with reference to a time chart of FIG. 1B. Suppose now that the clock supply stop request signal 1c turns asynchronously into its low level from its high level as shown at ① in FIG. 1B. Then, the signal 1c is first synchronized, as shown at ②, with the clock signal 1b through the flip-flop 11 so as to be changed to a signal 1d. Because of the possibility of occurrence of chattering in the signal 1d during the synchronization, this signal 1d is then synchronized, as shown at ③, with the clock signal 1a through the flip-flop 12 so as to be changed to a signal 1e. In the meantime, the signal 1e is synchronized, as shown at ④, with the clock signal 1b through the flip-flop 13 so as to be changed to a signal 1f. The signals 1f and 1e are applied to AND gates 13 and 14 to inhibit the clock signals 1a and 1b, respectively, so that clock signals 1g and 1h to be supplied to the data processor unit 16 are fixed at their low level. Consequently, there occurs no signal level change in the data processor unit 16 which is in the form of a C-MOS device, and no power is now consumed by the data processor unit 16. Thus, the control circuit of the simplest form as shown in FIG. 1A can inhibit the supply of the clock signals 1a and 1b to the data processor unit 16.

However, due to the fact that the clock supply stop request signal 1c in FIG. 1A is applied from the exterior of the LSI or its period is constant, the clock supply stopping and restoring timing is fixed or not variable. Therefore, the operating microprocessor cannot be positively placed in itself in the mode of low power consumption at any time.

Figure 2:
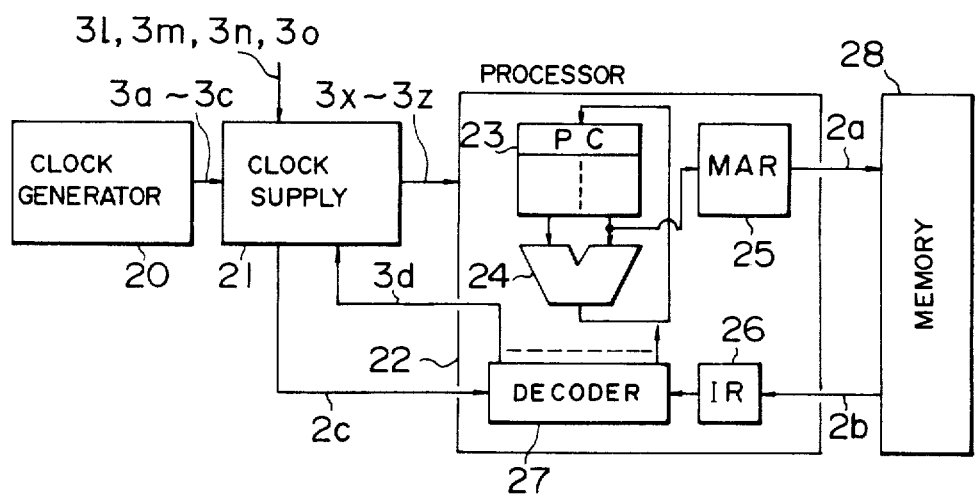
FIG. 2 is a block diagram showing generally the structure of a data processing apparatus provided with a clock signal supply control circuit embodying improvements according to the present invention.

FIG. 2 is a block diagram showing generally the structure of a data processing apparatus provided with a clock signal supply control circuit which is an improved embodiment of the present invention. The data processing apparatus includes a clock generating circuit 20, a clock supplying circuit 21 and a processor 22. The processor 22 includes a register file 23, an arithmetic circuit 24, a memory address register (MAR) 25, an instruction register (IR) 26 and a decoder 27. Reference numeral 28 designates a main memory. Clock signals 3a to 3c generated from the clock generating circuit 20 are applied to the clock supplying circuit 21, which is an improved embodiment of the present invention, to appear as clock output signals 3x to 3z from the clock supplying circuit 21. In response to the application of a clock signal supply stopping signal 3d from the processor 22, the clock supplying circuit 21 is locked against supply of the clock signals 3x to 3z. The clock supplying circuit 21 is unlocked from its locked state in response to the application of any one of interrupt signals 3l, 3m, 3n and 3o. The operation of the data processing apparatus will be described in further detail with reference to FIGS. 2 and 3.

(1) LOCKING OF CLOCK SUPPLY

Figure 3:
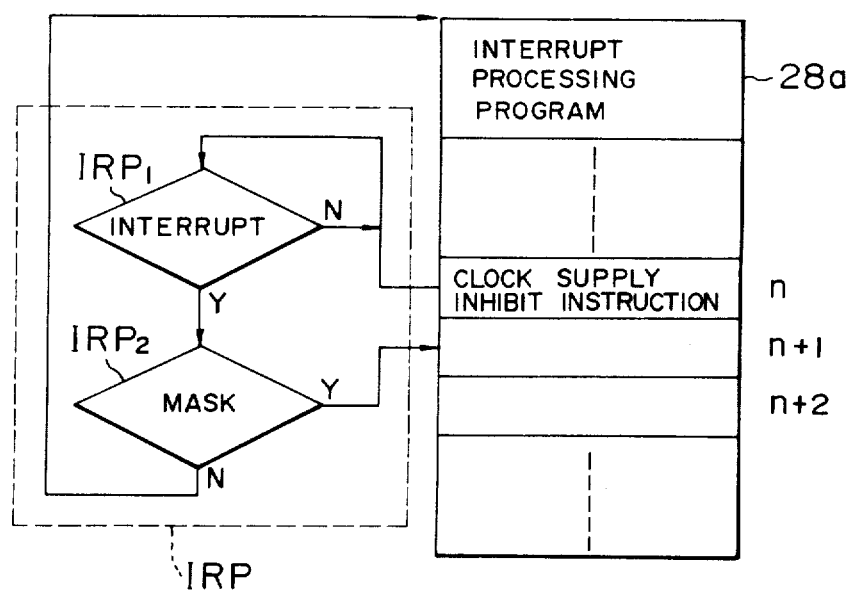
FIG. 3 is a flow chart illustrating how a clock supply inhibit instruction is read out and executed in FIG. 2.

The content n of a program counter PC in the register file 23 in the processor 22 is applied, as a signal 2a, to the main memory 28 through the memory address register (MAR) 25. In response to the application of the signal 2a to the main memory 28, a power consumption reducing instruction, that is, a clock supply inhibit instruction stored at the address n in FIG. 3 is applied, as a signal 2b, to the instruction register (IR) 26 to be set therein. This instruction is then decoded by the decoder 27 to be applied, as the clock supply stopping signal 3d to the clock supplying circuit 21 to lock the same. Consequently, the clock supplying circuit 21 is locked against supply of the clock signals 3x to 3z, and the processor 22 ceases to operate. At this time, however, the clock generating circuit 20 is continuously generating the clock signals 3a to 3c.

(2) UNLOCKING OF CLOCK SUPPLY

The clock supplying circuit 21 is connected to the sources of the interrupt signals 3l, 3m, 3n and 3o, and the clock signals 3x to 3z start to appear from the clock supplying circuit 21 as soon as at least one of these interrupt signals becomes active. That is, the clock supplying circuit 21 is interrupt pending in a standby state and is locked against supply of the clock signals 3x to 3z. In response to the application of at least one of the interrupt signals 3*l* to 3*o*, the clock signals 3*x* to 3*z* start to be supplied to the processor 22, and the processor 22 starts to operate. The clock supplying circuit 21 includes an interrupt masking function which judges whether or not the interrupt request applied to the circuit 21 is to be accepted. A signal 2*c* indicative of the result of judgment is applied from the clock supplying circuit 21 to the decoder 27. When the interrupt request is to be accepted, the first instruction in an interrupt processing program is read out to be executed, while when the interrupt request is not to be accepted, an instruction stored at the address (n+1) succeeding the address n storing the clock supply inhibit instruction is read out to be executed.

In FIG. 3, reference numeral 28*a* designates the memory map on the main memory 28. Suppose, for example, that the aforementioned power consumption reducing instruction (the clock supply inhibit instruction) stored at the address n has been read out to inhibit the supply of the clock signals 3*x* to 3*z* to the processor 22 from the clock supplying circuit 21. Then, when an interrupt signal is applied to the circuit 21, an interrupt handling routine IRP as shown in FIG. 3 is run. In the state in which the clock supplying circuit 21 is locked against the supply of the clock signals 3*x* to 3*z*, the step IRP$_1$ monitors continuously the application of an interrupt request. When the result of monitoring proves that an interrupt request appears (Yes), the step IRP$_2$ judges whether or not the interrupt request is masked. When the result of judgment proves that the interrupt request is not masked, the supply of the clock signals 3*x* to 3*z* from the clock supplying circuit 21 is started, and the corresponding interrupt processing program is executed. On the other hand, when the result of judgment proves that the interrupt request is masked, instructions are successively read out from the address (n+1) and succeeding addresses to be executed in order. (Of course, the supply of the clock signals from the clock supplying circuit 21 is started in this case.)

In the manner above described, the clock supplying circuit 21 supplying the actuating clock signals to the processor 22 is locked and unlocked to control the power consumption of the processor 22. The detailed structure and operation of this clock supplying circuit 21 will now be described.

Figure 4:
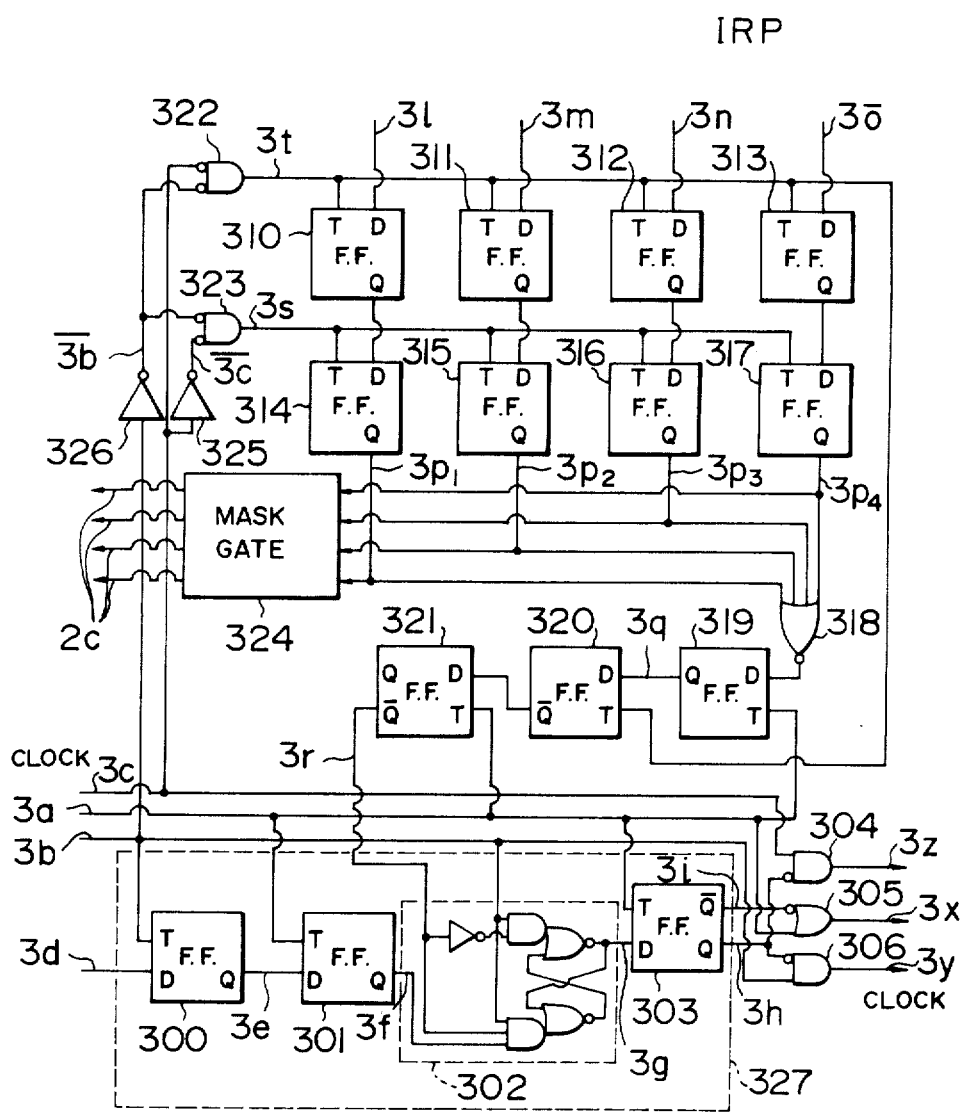
FIG. 4 is a circuit diagram showing in detail the structure of the clock signal supply control circuit shown in FIG. 2.

FIG. 4 shows the practical structure of the clock supplying circuit 21 according to the present invention. Referring to FIG. 4, the clock supplying circuit 21 includes a clock control circuit 327 composed of flip-flops 300 and 301 for detecting and synchronizing the clock supply inhibit instruction signal 3*d* applied from the processor 22 and flip-flops 302 and 303 for controlling stopping of the supply of the clock signals 3*x* to 3*z* to the processor 22. The clock supplying circuit 21 further includes clock gates 304, 305 and 306 for inhibiting the supply of the clock signals 3*a*, 3*b* and 3*c*, flip-flops 310 to 317 for synchronizing and storing the 4-level interrupt signals 3*l*, 3*m*, 3*n* and $\overline{3o}$, a NOR gate 318 for detecting application of at least one of the interrupt signals 3*l* to $\overline{3o}$, flip-flops 319, 320 and 321 for determining the timing of unlocking the circuit 21 from the locked condition, clock gates 322 and 323 for determining the timing of synchronization and registration of the interrupt signals 3*l* to $\overline{3o}$, and an interrupt mask gate 324.

The operation of the circuit 21 in the locked condition and in the unlocked condition will now be described.

(1) OPERATION FOR STOPPING THE CLOCK SUPPLY

For the purpose of explanation, it is supposed that the data processing apparatus is controlled according to a microprogram. When a micro instruction requesting stopping of the clock supply is read out from the microprogram commanding the process of execution of the clock supply inhibit instruction, the clock signal supply stopping signal 3*d* turns into its high level. This signal 3*d* is synchronized with the clock signal 3*b* to be stored in the flip-flop 300, and the output signal 3*e* from the flip-flop 300 is applied to the flip-flop 301 in timed relation with the clock signal 3*a*. The output signal 3*f* synchronized with the clock signal 3*a* and appearing from the flip-flop 301 acts to set the flip-flop 302 together with the clock signal 3*b*, and a clock inhibit signal 3*g* appears from the flip-flop 302 to instruct inhibition of the clock supply. This signal 3*g* is applied to the flip-flop 303 in synchronous relation with the clock signal 3*a*, and a pair of output signals 3*h* and 3*i* ($=\overline{3h}$) appear from the flip-flop 303 to control the clock gates 304, 305 and 306. Consequently, the clock supplying circuit 21 is locked in the condition in which the clock signal 3*x* of high level corresponding to the clock signal 3*a* appears from the clock gate 305, while the clock signals 3*y* and 3*z* of low level corresponding to the clock signals 3*b* and 3*c* appear from the clock gates 306 and 304, respectively. The clock signal 3*x* is maintained in its high level, because this clock signal 3*x* is used for the precharge of the dynamic logic for the micro operation of the data processing apparatus, therefore, maintaining the state of precharge during the locked condition of the circuit 21 ensures smooth operation of the data processing apparatus after the circuit 21 is unlocked. Thus, no power is consumed by the data processor 22 during the period in which the circuit 21 is locked against the supply of the clock signals. Since the clock signals 3*x*, 3*y* and 3*z* controlled by the respective clock gates 305, 306 and 304 in the manner above described are supplied to the processor 22, no change in the signal level occurs in the processor 22, and no power is consumed by the C-MOS circuit.

Figure 5:
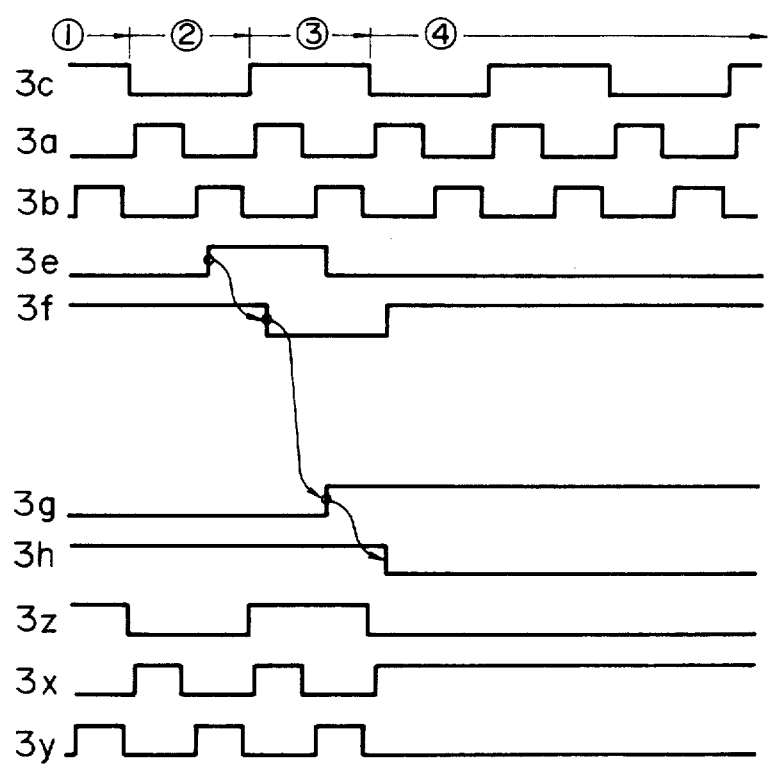
FIGS. 5 and 6 are time charts illustrating how the supply of the clock signals is inhibited and restored.

It will be seen from the description given with reference to FIGS. 2 and 3 that all of the clock signals 3*x* to 3*z* are not necessarily turned into their low level. As a matter of fact, it is merely necessary to maintain the clock signals 3*x* to 3*z* in an unchangeable state so that power may not be consumed by the C-MOS circuit. FIG. 5 shows a time sequence until the circuit 21 is locked against the supply of the clock signals 3*x* to 3*z*.

Referring to FIG. 5, ① indicates the time region in which the clock signals 3*a* to 3*c* are supplied to the clock supplying circuit 21 from the clock generating circuit 20, and the corresponding clock signals 3*x* to 3*z* are supplied from the circuit 21 to the processor 22. In the time region ② in FIG. 5, the signal 3*d* is applied from the decoder 27 to the flip-flop 300, and the signal 3*e* is applied from the flip-flop 300 to the flip-flop 301. In the time region ③ in FIG. 5, the output signal 3*f* from the flip-flop 301 is turned into its low level from its high level in response to the application of the clock signal 3*a*, and the output signal 3*g* from the flip-flop 302 is turned into its high level from its low level in synchronism with the clock signal 3*b*. In the time region ④ in FIG. 5, the state of the flip-flop 303 is changed in response to the application of the signal 3*g* in synchronous relation with the clock signal 3*a*, and the pair of signals 3h and 3i (=$\overline{3h}$) appear from the flip-flop 303. In this time region ④, the clock signals 3y and 3z are turned into their low level from their high level and are then maintained in the low level, while the clock signal 3x is turned into its high level from its low level and is then maintained in the high level. Thus, after the time region ④, there is no level change in each of the clock signals 3x to 3z.

It will be seen that, even in the time region ④, the clock generating circuit 20 is continuously generating its clock output signals 3a, 3b and 3c.

(2) OPERATION FOR RESTORING THE CLOCK SUPPLY

As described hereinbefore, the steps of clock supply stopping control are programable by instructions. On the other hand, the restoration of clock supply takes place in response to the application of an interrupt request to the data processing apparatus. The term "interrupt request" is used herein to indicate a request such as a service request, an error correction request or a reset request applied from an input unit and an output unit.

Figure 6:
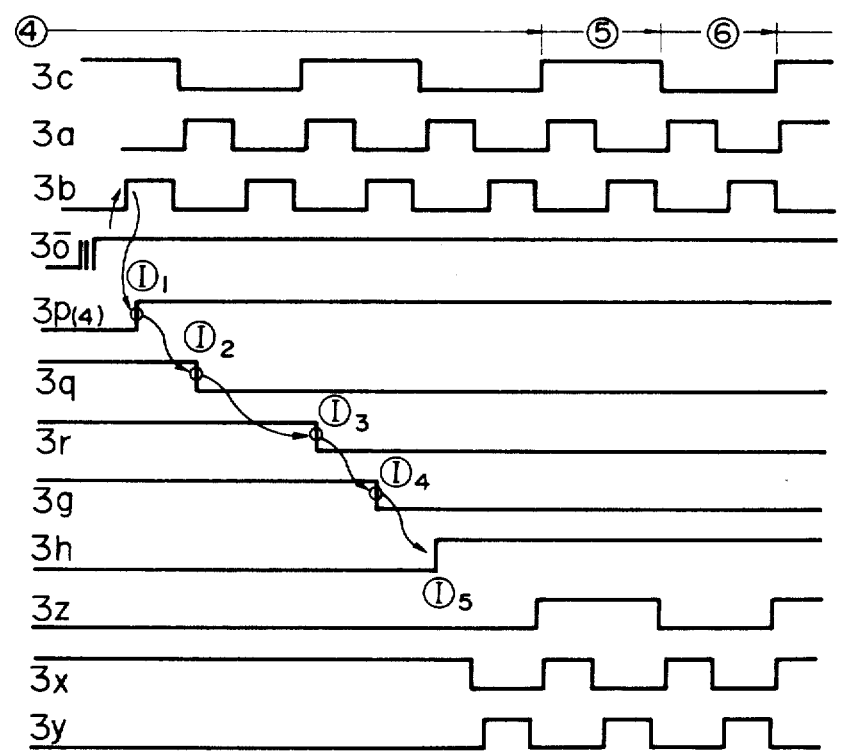

The 4-level interrupt signals 3l, 3m, 3n and $\overline{3o}$, shown in FIG. 4 are applied to the first group of flip-flops 310, 311, 312 and 313 respectively together with a synchronizing clock signal 3t applied from the clock gate 322. Then, the interrupt signals 3l, 3m, 3n and $\overline{3o}$ are applied to the second group of flip-flops 314, 315, 316 and 317 respectively together with another synchronizing clock signal 3s applied from the clock gate 323 for preventing chattering. For example, the output signal 3p₄ from the flip-flop 317, which signal is one of the synchronized interrupt signals, is applied to the NOR gate 318 to be stored in the flip-flop 319 in response to the application of the clock signal 3a. Application of any one of the 4-level synchronized interrupt signals $3p_1$, $3p_2$, $3p_3$ and $3p_4$ to the NOR gate 318 is detected as the presence of an interrupt request and this is reflected in the state of the flip-flop 319. The output signal 3q from the flip-flop 319 is further synchronized in the flip-flops 320 and 321 to appear as an output signal 3r from the flip-flop 321, and this signal 3r is applied to reset the flip-flop 302 functioning as the clock supply stopping control means. The flip-flop 303 generates the output signals 3h and 3i (=$\overline{3h}$) in synchronism with the clock signal 3a. These output signals 3h and 3i (=$\overline{3h}$) are applied to the clock gates 304 and 306 together with the clock signal 3a, and thus the circuit 21 is unlocked from its locked condition. FIG. 6 shows a time chart of the clock supply restoring operation, and it will be seen in FIG. 6 that the clocking can be started smoothly.

As shown at ①₁ in FIG. 6, in response to the application of the interrupt request signal 3o, the flip-flop 317 generates its output signal 3p₄ in synchronism with the clock signal 3b. Then, as shown at ①₂ in FIG. 6, the output signal 3q from the flip-flop 319 turns into its low level from its high level in synchronism with the clock signal 3a. Subsequently, as shown at ①₃ in FIG. 6, the output signal 3r from the flip-flop 321 turns into its low level from its high level in synchronism with the clock signal 3a. In response to the application of the signal 3r to the flip-flop 302, its output signal 3g turns into its low level from its high level, as shown at ①₄ in FIG. 6. Consequently, the output signal 3h from the flip-flop 303 turns into its high level from its low level as shown at ①₅ in FIG. 6. At the same time, the output signal 3i (=$\overline{3h}$) (not shown) from the flip-flop 303 turns into its low level from its high level. Thus, in the time region ⑤ in FIG. 6, the supply of the clock signals 3x, 3y and 3z is started again. The same applies to the time region ⑥ in FIG. 6.

Figure 7:
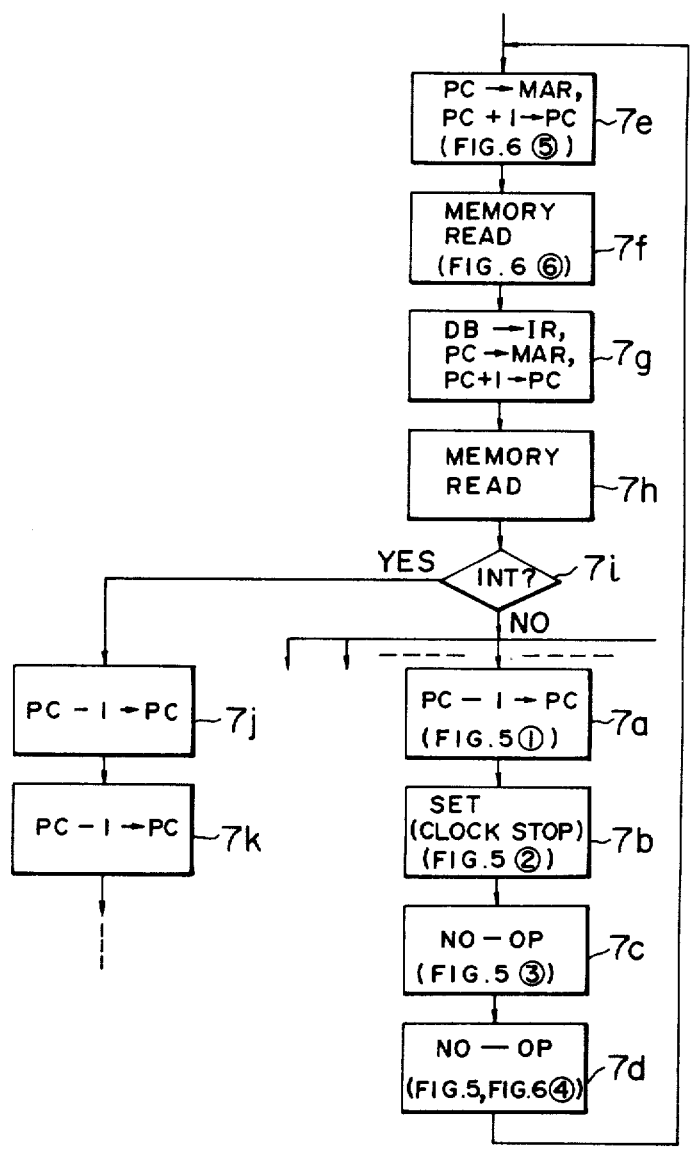
FIG. 7 is a flow chart illustrating how micro instructions are executed after the supply of the clock signals is restored in FIG. 2.

The operation of the data processing apparatus after the steps of clock supply restoration will now be described. After the clock supplying circuit 21 is unlocked from the locked condition in response to the application of at least one of the interrupt signals 3l, 3m, 3n and $\overline{3o}$, the processor 22 in the data processing apparatus judges whether or not the interrupt processing program is to be executed on the basis of the signal 2c applied from the mask gate 324, and continues the steps of processing depending on the result of judgment. The operation of the processor 22 will be described with reference to a micro instruction flow chart shown in FIG. 7. In this flow chart, each block represents a micro instruction. The flow chart of FIG. 7 will now be explained in relation to the time charts shown in FIGS. 5 and 6. Execution of the micro instructions for stopping the clock supply starts from a block 7a in which a "1" is decremented from the count of the program counter PC. This is because the pipe-line control has been done in the instruction fetch step, and a "1" has been incremented to the count of the program counter PC. However, the above step has not any direct concern with the present invention, and its detailed description will be omitted. In the block 7b, a micro instruction for stopping the clock supply is issued so as to lock the clock supplying circuit 21. A micro instruction NO-OP (no operation) in the block 7c instructs the time allowance provided until the clock supplying circuit 21 is completely locked. A micro instruction NO-OP in the block 7d instructs that the locked clock supplying circuit 21 be interrupt pending.

When an interrupt request is accepted while the data processing apparatus is placed in the state of NO-OP by the micro instruction given in the block 7d, the control shifts from the block 7d to the block 7e after a predetermined synchronization cycle. The block 7e includes a first micro instruction in an instruction fetch cycle. In the block 7e, the count of the program counter PC is transferred to the memory address register (MAR) 25, and a "1" is incremented to the count of the program counter 25. In the block 7f, the instruction is read out from the main memory 28, and, in the block 7g, the read-out instruction is registered in the instruction register (IR) 26. After extension of a micro instruction "Memory Read" in the block 7h, the presence or absence of an interrupt request is checked in the block 7i. When the result of checking in the block 7i proves that the signal 2c indicative of the presence of an interrupt request appears from the mask gate 324, the block 7i is followed by the block 7j so as to execute the interrupt processing program. On the other hand, when the result of checking in the block 7i is "No", the block 7i is followed by execution of one of the micro programs corresponding to the instruction fetched in the block 7g. It will be seen from the above description that, after unlocking of the clock supplying circuit 21, the macro program is so controlled that the interrupt processing program or another instruction is executed depending on the presence or absence of the output signal 2c from the mask gate 324.

It will thus be understood that, according to the illustrated embodiment of the present invention, user-programable clock supply control can be attained by a special instruction so that the operation mode of the data processing apparatus shifts to the reduced power consumption mode. Further, depending on the interrupt masking condition, the shift to the interrupt processing program or another instruction can be flexibly controlled.

According to the aforementioned embodiment of the present invention, the supply of clock signals is controlled to flexibly attain the control of power consumption so that the power consumption can be further reduced.

The present invention is in no way limited to the embodiment above described, and various modifications as described hereinunder may be made.

Figure 8:
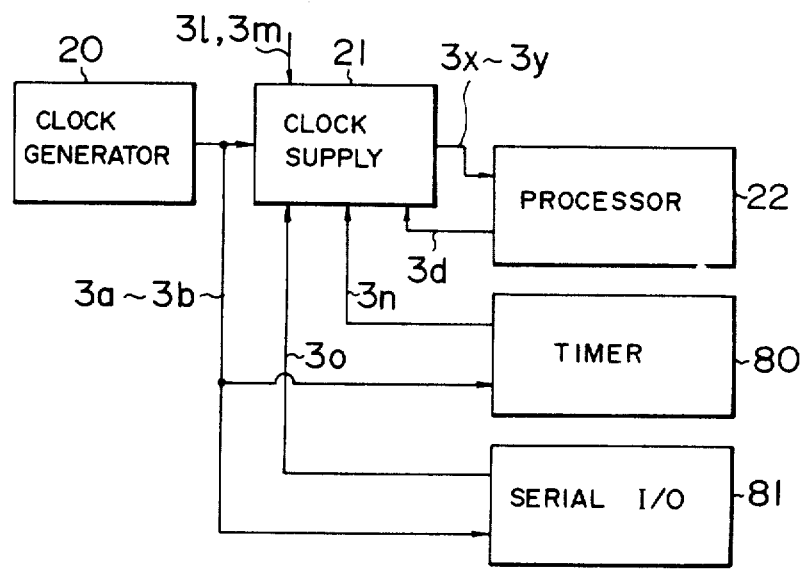
FIGS. 8 and 9 show modifications in which the clock supply inhibited block is divided into a plurality of blocks.

FIG. 8 shows a modification in which the data processing apparatus is divided into a plurality of blocks, that is, blocks for which the supply of the clock signals is inhibited and is not inhibited when the clock signal supply inhibit instruction is read out from the memory 28. The data processing apparatus comprises, in addition to the system shown in FIG. 2, a timer 80 continuously receiving the clock signals 3a to 3c and a serial input/output (I/O) unit 81. The manner of stopping and restoring the clock supply in the apparatus shown in FIG. 8 will now be described.

When the clock signal supply inhibit instruction is detected by the processor 22, the processor 22 applies the clock supply stopping signal 3d to the clock supplying circuit 21, and the circuit 21 stops the supply of the clock signals 3x to 3y to the processor 22. Although the processor 22 ceases to operate, the timer 80 and the serial I/O unit 81 remain active due to the continuous application of the clock signals 3a to 3c thereto. When a timer interrupt signal 3n from the timer 80, or an overflow or another interrupt signal 3o from the serial I/O unit 81, or one of the external interrupt signals 3l and 3m is applied to the locked clock supplying circuit 21, the clock supplying circuit 21 starts to operate, and the processor 22 executes the interrupt processing.

Figure 9:
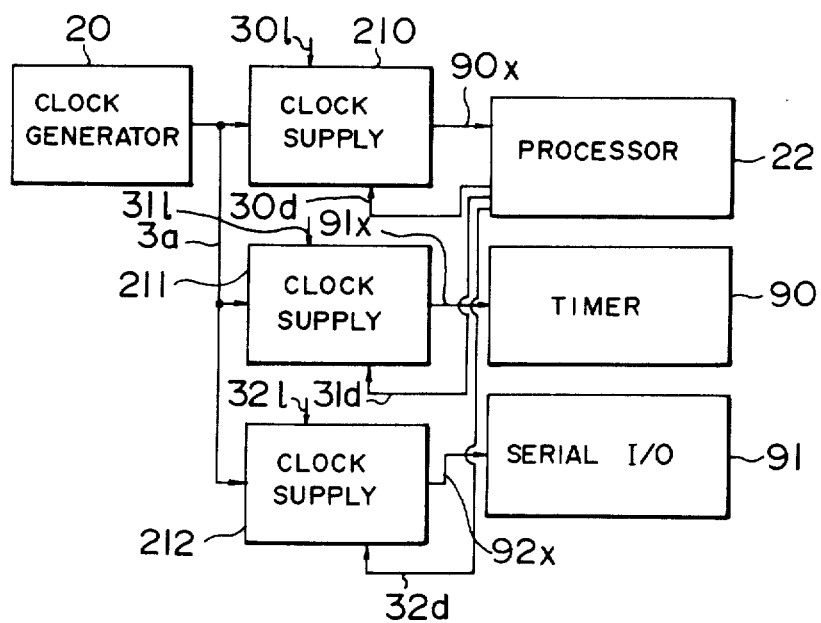

FIG. 9 shows another modification in which the clock supplying circuit 21 is replaced by a plurality of clock supplying circuits 210, 211 and 212, and the processor 22 executes a plurality of clock signal supply inhibit instructions for independently locking and unlocking the circuits 210, 211 and 212. Suppose that the processor 22 can execute seven clock signal supply inhibit instructions I1 to I7. Then, all the combinations of processor output signals 30d, 31d and 32d can be obtained by the execution of the instructions I1 to I7 in the processor 22 such that the signal 30d appears as a result of execution of the instruction I1, the signal 31d appears as a result of execution of the instruction I2, the signals 30d and 31d appear as a result of execution of the instruction I3, the signal 32d appears as a result of execution of the instruction I4, and so on. Thus, by the execution of these instructions I1 to I7, the supply of clock signals 90x, 91x and 92x from the clock supplying circuits 210, 211 and 212 to the processor 22, a first block 90 and a second block 91 respectively can be selectively stopped according to any desired combination. The individual clock supplying circuits 210, 211 and 212 can be independently unlocked in response to the application of interrupt signals 30l, 31l and 32l respectively. In the system having the above construction, the processor 22 can instruct to inhibit the supply of the clock signal to the block which need not operate. The arrangement shown in FIG. 9 is also effective for the reduction of the power consumption.

Figure 10:
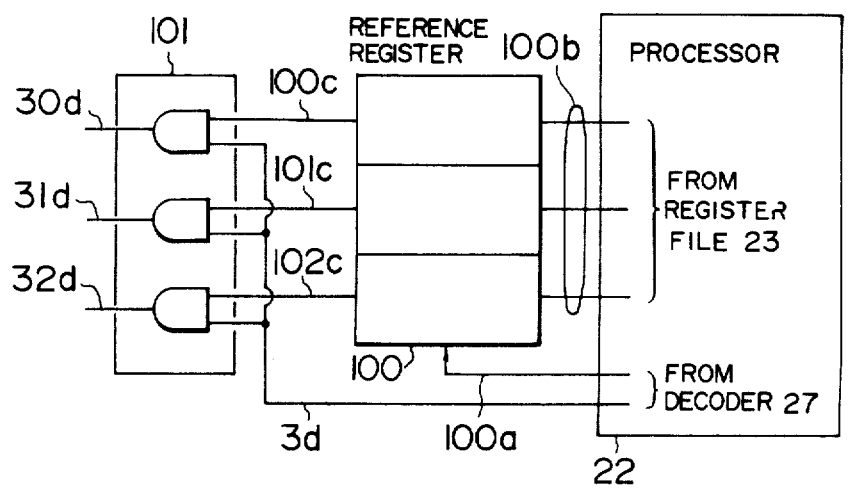
FIG. 10 shows another modification in which a reference register for inhibiting the supply of the clock signals is provided.

FIG. 10 shows another modification in which a reference register 100 and a mask gate 101 for the clock signal supply inhibit purpose are provided. The modification shown in FIG. 10 differs from that shown in FIG. 9 in the clock signal supply inhibit procedure only, and only this difference will be described herein.

(1) SETTING OF CLOCK SIGNAL SUPPLY INHIBITED BLOCK

One of the contents of the register file 23 in the processor 22 is supplied, as an identification code signal 100b, to the reference register 100, in response to a reference register setting instruction. The data is set in the reference register 100 in response to the application of a setting signal 100a from the decoder 27 to the register 100. The output signals 100c, 101c and 102c from the reference register 100 are normally masked by the mask gate 101, and the clock signal supply inhibit signals 30d, 31d and 32d do not normally appear from the mask gate 101.

(2) OUTPUT OF CLOCK SIGNAL SUPPLY INHIBIT SIGNALS

The signal 3d is applied to the mask gate 101 from the processor 22 when the processor 22 executes a clock signal supply inhibit instruction. Depending on the data registered in the reference register 100, one or more of the inhibit signals 30d, 31d and 32d are applied to the associated clock supplying circuits 210, 211 and 212 thereby inhibiting the supply of the corresponding clock signal or signals.

The data registered in the reference register 100 can be renewed by the setting instruction above described. Therefore, the clock signal supply inhibited blocks can be replaced by programable ones.

Figure 11:
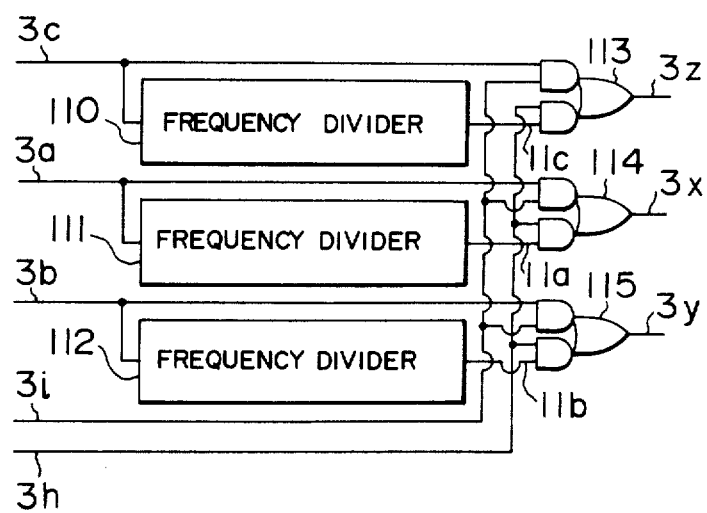
FIGS. 11 and 12 show modifications in which, in lieu of inhibiting the supply of the clock signals, the period of the clock signals is made variable for the purpose of reducing the power consumption.

FIG. 11 shows another modification in which the clock gates 304 to 306 in the clock supplying circuit 21 shown in FIG. 4 are replaced by frequency divider circuits 110 to 112 and associated selectors 113 to 115. The frequency divider circuits 110 to 112 provide clock signals 11a to 11c having a period longer than that of the respective clock signals 3a to 3c. Because of the above construction, the output signals 3h and 3i (=3h) from the flip-flop 303 take normally the high level and low level respectively, and the clock signals 3a to 3c are normally selected by the selectors 113 to 114 to appear as the clock signals 3x to 3z respectively. Then, when a clock signal supply inhibit instruction is executed by the processor 22, the signals 3h and 3i are inverted into the low level and high level respectively. In this case, the clock signals 11a to 11c of longer period are selected by the selectors 113 to 115 to appear as the clock signals 3x to 3z respectively.

When the signals 3h and 3i are exchanged, clock signals having a period shorter than the normal one are supplied in response to the execution of a clock signal supply inhibit instruction.

Figure 12:
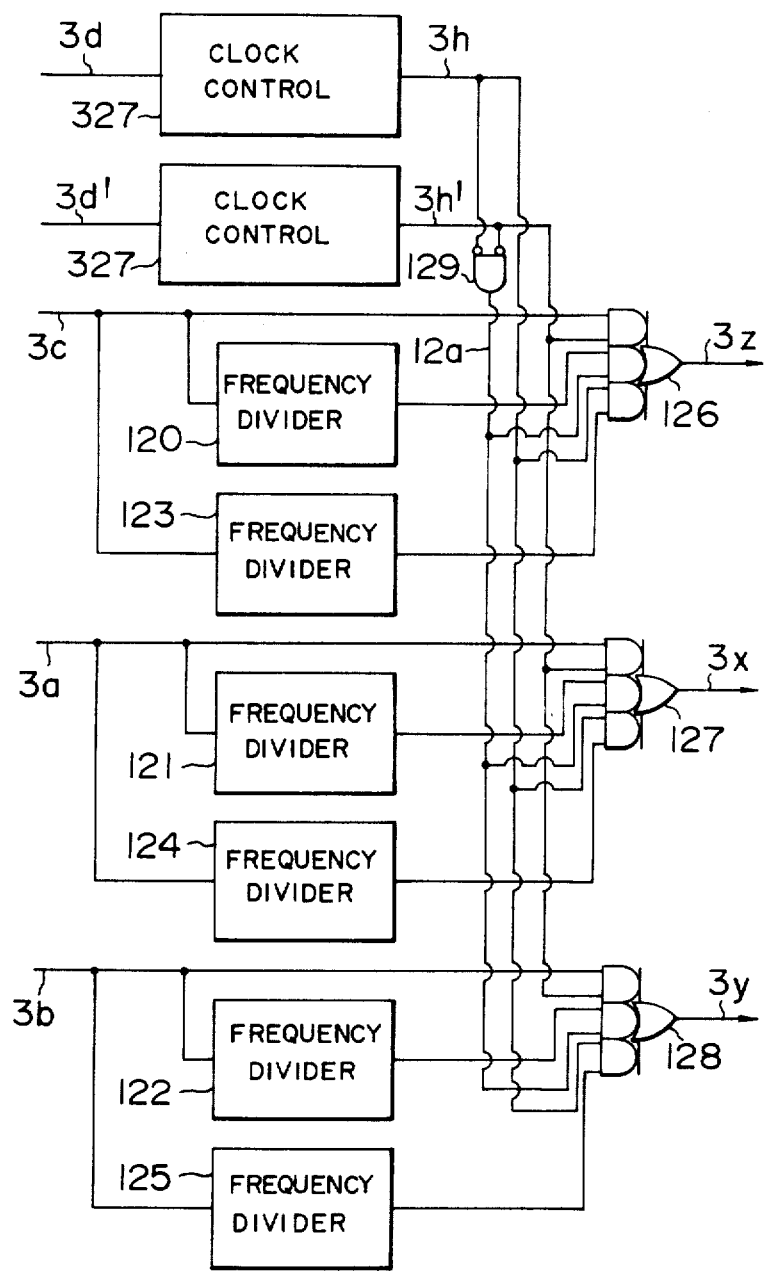

FIG. 12 shows another modification in which its clock generator part can generate clock signals having a clock period variable between a longer period and a shorter period in addition to a normal clock period. In this modification, signals 3d and 3d' appear from the decoder 27 in the processor 22 in response to a longer-period switching instruction and a shorter-period switching instruction respectively.

(1) NORMAL CLOCK PERIOD

Unless especially a clock period switching instruction is read out, the output signals 3h and 3h' from the clock control circuits 327 are in their low level. Therefore, an output signal 12a of high level appears from a gate 129, and output signals from frequency divider circuits 120 to 122 are selected by associated selectors 126 to 128 to provide the clock signals 3x to 3z of normal clock period.

(2) LONGER CLOCK PERIOD

When a longer-period switching instruction is read out, only the signal 3d is active, and, as a result, the output signal 3h from the associated clock control circuit 327 is turned into its high level. Consequently, output signals from low-repetition frequency divider circuits 123 to 125 are selected by the selectors 126 to 128 to provide the clock signals 3x to 3z whose period is longer than the normal one.

(3) SHORTER CLOCK PERIOD

When a shorter-period switching instruction is read out, only the signal 3d' is active, and, as a result, the output signal 3h' from the associated clock control circuit 327 is turned into its high level. Consequently, the clock signals 3a to 3c are directly selected by the selectors 126 to 128 to provide the clock signals 3x to 3z having the shortest period or high-repetition clock signals.

Thus, the power consumption can be controlled by changing the clock period in response to a clock frequency switching instruction read out from the memory.

What we claim is:

1. In a data processing apparatus for carrying out data processing, including data processing means having logic circuits including C-MOS devices, memory means for storing at least one data processing program, clock signal generating means for generating a clock signal to be supplied to said data processing means including said logic circuits, and clock signal supplying means for controlling the supply of said clock signal to said data processing means including said logic circuits, said data processing program including a plurality of data processing instructions, said data processing means operating to successively read out said data processing instructions stored in said memory means to carry out various operations including data processing, said clock signal having a first potential level and a second potential level which is different from said first potential level, said first and second potential levels repeating in turn at a predetermined clock period, a method of controlling the supply of said clock signal to said data processing means including said logic circuits comprising the steps of:

storing data processing instructions including at least one clock signal supply inhibit instruction in said memory means prior to carrying out data processing;

reading out each of said data processing instructions from said memory means;

decoding and identifying each of said data processing instructions read out of said memory means including said clock signal supply inhibit instruction; and generating a clock signal supply stopping signal and supplying said clock signal supply stopping signal to said clock signal supplying means when any one of said data processing instructions is identified as the clock signal supply inhibit instruction to inhibit said clock signal from being supplied from said clock signal generating means to a predetermined part of said data processing means having logic circuits by maintaining the potential level of said clock signal supplied to said predetermined part at said first potential level or said second potential level, whereby power consumption in said logic circuit is reduced.

2. A method as claimed in claim 1, further comprising the steps of:

categorizing said data processing means including said logic circuits into a plurality of predetermined circuit blocks;

storing in said memory means a plurality of clock signal supply inhibit instructions each of which corresponds to a respective one of said plurality of predetermined circuit blocks prior to carrying out data processing; and when any one of said data processing instructions read out of memory means and decoded is identified as a clock signal supply inhibit instruction, inhibiting said clock signal from being supplied to that circuit block corresponding to said one clock signal supply inhibit instruction forming said data processing instruction.

3. A method as claimed in claim 2, wherein a plurality of said clock signal supply inhibit instructions are successively read out to inhibit application of said clock signal to the corresponding ones of said circuit blocks.

4. A method as claimed in claim 2, wherein said data processing apparatus includes a clock signal supply inhibit reference register, and further including storing in said reference register an identification code for identifying selected ones of said predetermined circuit blocks, when any one of said clock signal supply inhibit instructions is read out, comparing the corresponding predetermined circuit block with said identification codes registered in said reference register, and when said corresponding predetermined circuit block is found to have its identification code registered in said reference register, inhibiting the supply of said clock signal to said corresponding predetermined circuit block.

5. A method as claimed in claim 4, wherein the contents of said reference register are updated to provide a change of the selected predetermined circuit blocks for which the supply of said clock signal is to be inhibited, and the supply of said clock signal to said circuit blocks corresponding to the updated contents of said reference register is inhibited upon detection and identification of a corresponding clock signal supply inhibit instruction.

6. A method as claimed in claim 1, wherein said data processing apparatus includes means for generating an interrupt signal requesting interrupt processing by said logic circuit and further comprising releasing the inhibiting of the application of said clock signal to said logic circuit in response to generation of said interrupt signal.

7. A method as claimed in claim 6, further including the step of determining whether or not said interrupt signal is to be accepted on the basis of the logical product of said interrupt signal and selected mask logic of said interrupt signal, and initiating the interrupt processing by said logic circuit when said interrupt signal is to be accepted.

8. A method as claimed in claim 1, wherein a plurality of said clock signals are applied to said logic circuit as separate signals.

9. A method as claimed in claim 8, wherein, when the supply of said plural clock signals is inhibited, the inhibition is effected by maintaining one or more of the plural clock signals at a high potential level, while maintaining the remaining clock signals at a low potential level.

10. A method as claimed in claim 1, further comprising the step of supplying interrupt request signals of input/output control units to said clock signal supply means to remove the inhibition of and restart the supply of said clock signal when at least one of said interrupt request signals is supplied, said interrupt request signals being issued from said input/output control units or the like to request said data processing means to accept interrupt processings requested by said input/output control units.

11. A method as claimed in claim 10, further comprising the steps of:
   selecting one of said interrupt request signals supplied to said clock signal supply means;
   carrying out, when any one of said interrupt request signals to said clock signal supply means is selected, a corresponding interrupt processing to said selected interrupt request signal,
   carrying out, when none of said interrupt request signals is selected, processing of data processing instructions succeeding said clock signal supply inhibit instructions.

12. A method as claimed 1, wherein, when said clock supply inhibit instruction is read out, the clock period of said clock signal is made longer than said predetermined clock period and said clock signal of the longer clock period is continuted to be supplied.

13. In a data processing apparatus including a processor, input/output devices whose operations are processed by said processor when interrupt request signals are issued from said input/output devices, wherein said processor includes a register file, an arithmetic circuit, an address register, an instruction register and a decoder, the improvement comprising:
   a clock signal generating circuit for generating clock signals, each of said clock signals having a first potential level and a second potential level which is different from said first potential level, said first and second potential levels repeating in turn at a predetermined clock period, said processor being connected to receive said clock signals from said clock signal generating circuit for carrying out data processing in synchronism with said clock signals;
   main memory means for storing instructions including clock signal supply inhibit instructions; and
   a clock signal supply control circuit connected to receive said clock signals from said clock signal generating circuit as input signals thereto for supplying said clock signals to said processor, said processor including means for reading said instructions including said clock signal supply inhibit instructions out of said main memory means, said decoder including means for decoding said instructions including said clock signal supply inhibit instructions read out of said memory means and for identifying each of said clock signal supply inhibit instructions to generate a clock signal supply stopping signal, and said clock signal supply control circuit including means for inhibiting said clock signals from being supplied to at least part of said processor in response to said clock signal supply stopping signal by maintaining the potential level of said clock signal supplied to said part of said processor at said first or second potential level when at least one of said instructions is identified as said clock signal supply inhibit instruction, and said clock signal supply control circuit including means for restarting the supply of said clock signal when said interrupt request signals are issued.

14. A data processing apparatus as claimed in claim 13, wherein said clock signal supply control circuit comprises:
   a clock control circuit including first flip-flop means connected to said decoder for synchronizing said output of said decoder with one of said clock signals and for outputting synchronized output signals when one of said instructions read out of said memory unit is decoded and identified as the clock signal supply inhibit instruction, and second flip-flop means connected to receive said synchronized output signal of said first flip-flop means as an input signal thereof for outputting signals to be used for controlling the supply of said clock signals in order to inhibit the supply of said clock signals; and
   clock gating means for inhibiting the supply of said clock signals to said processor means in response to the output signals of said second flip-flop means of said clock control circuit.

15. A data processing apparatus as claimed in claim 14, wherein said clock signal supply control circuit further comprises:
   third flip-flop means for synchronizing said interrupt request signals which are input signals of said third flip-flops with said clock signals and for outputting the synchronized interrupt request signals;
   logical sum means connected to receive said synchronized output signals of said third flip-flop means as input signals thereof for detecting that at least one of said interrupt request signals is issued and for outputting a signal in response to such detection;
   fourth flip-flop means for setting a timing of restarting of the supply of the clock signals in response to the output signal of said logical sum means and for outputting a signal at said timing, the signal output from said fourth flip-flop means being supplied to said second flip-flop means in order to restart the supply of said clock signals.

16. A data processing apparatus as claimed in claim 15, further comprising means for receiving said synchronized interrupt request signals and for selecting one of said synchronized interrupt request signals as the one which is to be processed in order to carry out data processing on the basis of the selected interrupt request signal.

17. In a data processing apparatus including a logic circuit composed of complementary metal oxide devices, said logic circuit including data processing means having at least a register file, an arithmetic circuit, an address register, an instruction register and a decoder, main memory means for storing programmed instructions to carry out data processing, clock signal generating means for generating a clock signal having a first potential level and a second potential level which is different from said first potential level, said first and second potential levels repeating alternately at a predetermined clock period, and clock signal supply control means for controlling said clock signal so as to supply or not to supply said clock signal to said logic circuit, said data processing apparatus successively reading out said instructions stored in said in main memory to carry out data processing;

a method of controlling the supply of said clock signal to said logic circuit comprising the steps of:

storing in said main memory means a clock signal supply inhibit instruction together with other data processing instructions;

reading out said clock signal supply inhibit instruction and said other data processing instructions in a sequence from said main memory means to carry out data processing;

decoding each of the instructions read out of said main memory means and identifying whether or not each of the instructions is said clock signal supply inhibit instruction;

supplying a clock signal supply inhibit signal to said clock signal supply control means from said data processing means when a decoded instruction is identified as the clock signal supply inhibit instruction;

when said decoded instruction is identified as not being the clock signal supply inhibit instruction, carrying out data processing corresponding to said decoded instruction; and when said decoded instruction is identified as being said clock signal supply inhibit instruction, inhibiting the supply of said clock signal from said clock signal generating means to said data processing means by means of said clock signal supply control means in response to said inhibit signal until an interrupt processing request signal is supplied to said clock signal supply control means, whereby power consumption in said logic circuit is reduced by inhibiting operation in said logic circuit.

18. A method as claimed in claim 17, wherein said logic circuit further includes a timer and serial input/output means, said logic circuit being divided into regions comprising said data processing means, timer and serial input/output means, and wherein said clock signal supply control means includes a reference register for said divided logic circuit, and wherein said method further includes the steps of:

storing in said reference register an identification code corresponding to one of the regions of the divided logic circuit;

when an instruction read out of said main memory means is identified as the clock signal supply inhibit instruction, reading out said identification code to identify one of the regions of the divided logic circuit; and inhibiting the supply of said clock signal to the region corresponding to said identification code.

19. A method as claimed in 18, further including the steps of:

updating said identification code in said reference register in dependence upon the region to which the supply of said clock signal is to be inhibited, and inhibiting the supply of said clock signal to the region corresponding to the updated identification code when the updated identification code is read out.

20. A method as claimed in claim 17, further comprising the steps of:

supplying an interrupt signal requesting interrupt processing to said clock signal supply control means, and when said interrupt processing request signal is accepted by said clock signal supply control means, removing said clock signal supply inhibit signal to restart the supply of said clock signal to said logic circuit.

21. A method as claimed in claim 20, further including the steps of:

determining whether or not said interrupt signal is to be accepted on the basis of a logical product of said interrupt signal and a mask logic which determines whether or not said interrupt signal is to be accepted, restarting the supply of said clock signal to said logic circuit and initiating the interrupt processing corresponding to said interrupt signal when said interrupt signal is determined to be accepted and is accepted, and reading out instructions following said clock signal inhibit instruction in said main memory means to carry out the corresponding data processing under control of said following instructions when said interrupt signal is determined not to be accepted.

22. A method as claimed in claim 17, wherein said clock signal supplied from said clock signal supplying means to said logic circuit comprises at least a pair of clock signals having the same clock period but being 180° out of phase.

23. A method as claimed in claim 17, wherein said clock signal is maintained at said first potential level or second potential level so that the inhibition of said supply of said clock signal is effected.

24. A method as claimed in claim 17, wherein, when said clock signal supply inhibit instruction is read out, the clock period of said clock signal is made longer than said predetermined clock period and said clock signal of the longer clock period is continued to be supplied.

25. A data processing apparatus comprising:

a logic circuit composed of complementary metal oxide devices, said logic circuit having data processor means including at least a register file, an arithmetic circuit, an address register, an instruction register and an instruction decoder;

main memory means for storing program instructions to carry out data processing, including a clock signal supply inhibit instruction;

clock signal generating means for generating a clock signal having a first potential level and a second potential level which is different from the first potential level, said said first and second potential levels repeating alternately at a predetermined clock period;

clock signal supply control means for controlling said clock signal so as to supply or not supply said clock signal to said logic circuit; and said processor means operating in response to said clock signal to successively read out instructions stored in said main memory means to carry out data processing;

wherein said clock signal supply control means comprises:

a clock control circuit connected to receive as input signals thereto both a clock signal supply inhibit signal from said decoder and said clock signal from said clock signal generating means, said clock control circuit including means for synchronizing said clock signal supply inhibit signal with said clock signal, said clock signal supply inhibit signal being produced by said instruction decoder when the content of said instruction register which is read out of said main memory means is decoded and identified by said instruction decoder as said clock signal supply inhibit instruction;

first clock gating means for inhibiting the supply of said clock signal in response to said synchronized clock signal supply inhibit signal;

first flip-flop means for storing an interrupt signal at a predetermined timing;

second clock gating means for synchronizing a received interrupt signal requesting interrupt processing with said clock signal to derive a timing signal for storing the synchronized interrupt signal in said first flip-flop means; and second flip-flop means for setting the timing for releasing the inhibiting of the supply of said clock signal in response to the output of said first flip-flop means.

26. A data processing apparatus as claimed in claim 25, wherein said clock signal supply control means comprises third flip-flop means for synchronizing said clock signal supply inhibit signal with said clock signal and fourth flip-flop means for inhibiting the supply of said clock signal.

27. A data processing apparatus as claimed in claim 25, wherein said first flip-flop means comprises:

a plurality of first flip-flops each provided correspondingly to a different one of a plurality of interrupt signals requesting interrupt processing so as to accept said plurality of interrupt signals, said plurality of first flip-flops operating to synchronize said plurality of interrupt signals with said clock signal for storing said synchronized interrupt signals; and logical sum means for outputting a logical sum of each of the output signals of said plurality of first flip-flops.

28. A data processing apparatus as claimed in claim 27, wherein said clock signal supply control means further comprises:

a plurality of second flip-flops for preventing chattering each connected in cascade to a different one of said first flip-flops so as to receive the output signal of said first flip-flops, the outputs of said second flip-flops being supplied to said logical sum means.

29. A data processing apparatus as claimed in claim 28, wherein said clock signal supply control means further comprises mask gate means connected to receive the output signals of said second flip-flops for determining whether or not said interrupt signals are to be accepted and for supplying an output signal to said data processor means when one of said interrupt signals is determined to be accepted so as to carry out the interrupt processing.

30. A data processing apparatus as claimed in claim 25, wherein said logic circuit further includes a timer and serial input/output means, said logic circuit divided into three regions corresponding to said data processor means, said timer and said serial input/output means, respectively, and wherein said clock signal supply control means comprises three clock signal supply control circuits each corresponding to a different one of said three regions, to thereby control the supply of said clock signal to each divided region of said logic circuit individually.

31. A data processing apparatus as claimed in claim 25, wherein said clock signal supply control means further comprises a clock signal frequency divider for generating a second clock signal for a longer period than that of said clock signal instead of said clock signal when said clock signal supply inhibit signal is supplied to said clock signal supply control means to thereby supply said second clock signal of longer period to said logic circuit.

32. A data processing apparatus as claimed in claim 31, wherein said clock signal supply control means further comprises a selector for switching a clock signal between said second clock signal of longer period and said clock signal in response to a switching instruction when an instruction is decoded and identified by said instruction decoder as said switching instruction for switching the period of said clock signal from the longer period to a shorter period.

* * * * *